(12) United States Patent
Etchegoyen (10) Patent No.: US 9,311,485 B2
(45) Date of Patent: *Apr. 12, 2016

(54) DEVICE REPUTATION MANAGEMENT

(71) Applicant: Uniloc Luxembourg S.A., Luxembourg (LU)

(72) Inventor: Craig S. Etchegoyen, Plano, TX (US)

(73) Assignee: Uniloc Luxembourg S.A., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 14/510,965

(22) Filed: Oct. 9, 2014

(65) Prior Publication Data

US 2015/0026805 A1   Jan. 22, 2015

Related U.S. Application Data (63) Continuation of application No. 13/692,857, filed on Dec. 3, 2012, now Pat. No. 8,881,273.

(60) Provisional application No. 61/566,516, filed on Dec. 2, 2011.

(51) Int. Cl.
  *G06F 11/00* (2006.01)
  *G06F 21/57* (2013.01)
  *G06F 21/55* (2013.01)

(52) U.S. Cl.
  CPC .............. *G06F 21/57* (2013.01); *G06F 21/552* (2013.01); *G06F 2221/2129* (2013.01); *G06F 2221/2151* (2013.01)

(58) Field of Classification Search
  CPC ... H04L 63/1441; H04L 63/145; H04L 9/002; H04L 29/08378; H04L 67/1057

USPC .......................................................... 726/22
See application file for complete search history.

(56) References Cited

U.S. PATENT DOCUMENTS

| 5,884,272 | A | 3/1999 | Walker et al. |
| 5,991,735 | A | 11/1999 | Gerace |
| 6,138,155 | A | 10/2000 | Davis et al. |
| 6,167,517 | A | 12/2000 | Gilchrist et al. |

(Continued)

FOREIGN PATENT DOCUMENTS

WO   WO 2010/104928   9/2010

OTHER PUBLICATIONS

Clarke et al. "Secure Hardware Processors Using Silicon One-Way Functions," MIT Laboratory for Computer Science, Mar. 2002, p. 141.

(Continued)

*Primary Examiner* — Arvin Eskandarnia
(74) *Attorney, Agent, or Firm* — Sean D. Burdick (57) ABSTRACT

A device reputation server recognizes malicious devices used in prior attacks and prevents further attacks by the malicious devices. Server computers require a digital fingerprint of any client devices prior to providing any service to such client devices. Logging of network activity include the digital fingerprint of the device perpetrating the attack. When an attack is detected or discovered, the attacked server reports the attack and the digital fingerprint of the perpetrating device to a device reputation server. The device reputation server uses the report to improve future assessments of the reputation of the device associated with the reported digital fingerprint.

15 Claims, 8 Drawing Sheets

(56) References Cited

U.S. PATENT DOCUMENTS

| | | |
|---|---|---|
| 6,173,283 B1 | 1/2001 | Kasso et al. |
| 6,195,447 B1 | 2/2001 | Ross |
| 6,754,665 B1 | 6/2004 | Futagami et al. |
| 6,985,953 B1 | 1/2006 | Sandhu et al. |
| 6,993,580 B2 | 1/2006 | Isherwood et al. |
| 7,272,728 B2 | 9/2007 | Pierson et al. |
| 7,319,987 B1 | 1/2008 | Hoffman et al. |
| 7,523,860 B2 | 4/2009 | Bonelle et al. |
| 7,590,852 B2 | 9/2009 | Hatter et al. |
| 7,739,402 B2 | 6/2010 | Roese |
| 8,190,475 B1 | 5/2012 | Merrill |
| 8,255,948 B1 | 8/2012 | Black et al. |
| 8,326,001 B2 | 12/2012 | Free |
| 8,441,548 B1 | 5/2013 | Nechyba et al. |
| 8,483,450 B1 | 7/2013 | Derakhshani et al. |
| 8,635,087 B1 | 1/2014 | Igoe et al. |
| 2001/0049620 A1 | 12/2001 | Blasko |
| 2002/0038235 A1 | 3/2002 | Musafia et al. |
| 2002/0118813 A1 | 8/2002 | Brehm et al. |
| 2003/0163483 A1 | 8/2003 | Zingher et al. |
| 2004/0236649 A1 | 11/2004 | Yip et al. |
| 2005/0010780 A1 | 1/2005 | Kane et al. |
| 2005/0086498 A1 | 4/2005 | Hulick |
| 2005/0187890 A1 | 8/2005 | Sullivan |
| 2005/0278542 A1 | 12/2005 | Pierson et al. |
| 2006/0123101 A1 | 6/2006 | Buccella et al. |
| 2006/0212930 A1 | 9/2006 | Shull et al. |
| 2006/0222212 A1 | 10/2006 | Du et al. |
| 2006/0282660 A1 | 12/2006 | Varghese et al. |
| 2007/0050238 A1 | 3/2007 | Carr et al. |
| 2007/0050638 A1 | 3/2007 | Rasti |
| 2007/0113090 A1 | 5/2007 | Villela |
| 2007/0136792 A1 | 6/2007 | Ting et al. |
| 2007/0169181 A1 | 7/2007 | Roskind |
| 2007/0234409 A1 | 10/2007 | Eisen |
| 2007/0239606 A1 | 10/2007 | Eisen |
| 2007/0294403 A1 | 12/2007 | Verona |
| 2008/0027858 A1 | 1/2008 | Benson |
| 2008/0028455 A1 | 1/2008 | Hatter et al. |
| 2008/0040802 A1 | 2/2008 | Pierson et al. |
| 2008/0080750 A1 | 4/2008 | Bee et al. |
| 2008/0092058 A1 | 4/2008 | Afergan et al. |
| 2008/0102435 A1 | 5/2008 | Rogers et al. |
| 2008/0109491 A1 | 5/2008 | Gupta |
| 2008/0120195 A1 | 5/2008 | Shakkarwar |
| 2008/0212846 A1 | 9/2008 | Yamamoto et al. |
| 2008/0235375 A1 | 9/2008 | Reynolds et al. |
| 2008/0242279 A1 | 10/2008 | Ramer et al. |
| 2009/0089869 A1 | 4/2009 | Varghese |
| 2009/0150330 A1 | 6/2009 | Gobeyn |
| 2009/0178125 A1 | 7/2009 | Barber et al. |
| 2009/0186328 A1 | 7/2009 | Robinson et al. |
| 2009/0254476 A1 | 10/2009 | Sharma et al. |
| 2009/0292743 A1 | 11/2009 | Bigus et al. |
| 2009/0320096 A1 | 12/2009 | Nolan et al. |
| 2010/0125911 A1 | 5/2010 | Bhaskaran |
| 2010/0185871 A1 | 7/2010 | Scherrer et al. |
| 2010/0235241 A1 | 9/2010 | Wang et al. |
| 2010/0305989 A1 | 12/2010 | Mu et al. |
| 2011/0040825 A1* | 2/2011 | Ramzan et al. ............... 709/203 |
| 2011/0264644 A1 | 10/2011 | Grant et al. |
| 2011/0302003 A1 | 12/2011 | Shirish et al. |
| 2011/0319060 A1 | 12/2011 | Gentemann |
| 2012/0030771 A1 | 2/2012 | Pierson et al. |
| 2012/0041969 A1 | 2/2012 | Priyadarshan et al. |
| 2012/0063427 A1 | 3/2012 | Kandekar et al. |
| 2012/0167208 A1* | 6/2012 | Buford et al. .................... 726/22 |
| 2012/0185921 A1 | 7/2012 | Wechsler et al. |
| 2012/0233665 A1 | 9/2012 | Ranganathan et al. |
| 2012/0324581 A1* | 12/2012 | Economos et al. ............. 726/25 |

OTHER PUBLICATIONS

Fraga, David, "Information Technology, Regime Stability and Democratic Meaningfulness: A Normative Evaluation of Present and Potential Trends," Honor's Thesis for a Degree for College Undergraduate Research, University of Pennsylvania, Mar. 30, 2007, 73 pages.

Gassend, et al., Silicon Physical Unknown Functions and Secure Smartcards, May 2002.

"German Stores Put Money at Your Fingertips", Independent Online, Sep. 4, 2007.

Gupta et al., "Efficient Fingerprint-based User Authentication for Embedded Systems," *Proceedings of the 42nd Annual Design Automation Conference*, New York City, New York, Jun. 13, 2005.

Johnson et al. "Dimensions of Online Behavior: Toward a User Typology," *Cyberpsychology and Behavior*, vol. 10, No. 6, pp. 773-779, Dec. 2007. XP002617349.

Keane et al. "Transistor Aging," IEEE Spectrum, Apr. 25, 2011.

Kurchak, Kent, "Notes Application Strategies: User Activity Tracking," Mar. 14, 2004, 14 pages.

Lazanu et al., Modelling spatial distribution of defects and estimation of electrical degradation of silicon detectors in radiation fields at high luminosity, Oct. 10, 2006, 5 pages.

Lee et al., "Analogous Content Selection Mechanism Using Device Profile and Content Profile for U-Learning Environments," Jul. 15, 2009, Ninth IEEE International Conference on Advanced Learning Technologies, IEEE Computer Society.

Lemos, Robert, "Fingerprint Payments Taking Off Despite Security Concerns," *Security Focus*, Oct. 10, 2007, 3 pages.

"Lowes Foods Brings Biometric Payments and Check Cashing to Its Customers," Banking & Financial Solutions, Bioguard Components & Technologies Ltd, Feb. 7, 2005.

"Pay by Touch," From Wikipedia, Feb. 22, 2011, 2 pages.

Sim et al. "Continuous Verification Using Multimodal Biometrics", *IEEE Transactions on Pattern Analysis and Machine Intelligence*, vol. 29, No. 4, Apr. 1, 2007, IEEE Service Center, Los Alamitos, CA, pp. 687-700. XP011168507.

Soto, Lucy, "Not-so-Private Web: Information Leaks on Social Networks Can Leave Users Vulnerable," *The Atlanta Journal-Constitution*, Feb. 14, 2010, 3 pages.

Transcript from CBS Corp New, UBS Global Media Conference on Dec. 3, 2007 with Dave Poltrack by Matt Coppett, 9 pages.

Agbinya et al., "Development of Digital Environment Identity (DEITY) System for Online Access," Third International Conference on Broadband Communications, Information Technology & Biomedical Applications, Third International Conference on IEEE, Piscataway, New Jersey, Nov. 23, 2008, 8 pages. XP031368250.

Alstete, Jeffrey W., "Measurement Benchmarks of Real Benchmarking?" Hagan School of Business, Iona College, New Rochelle NY, USA, Benchmarking: An International Journal, vol. 15, No. 2, 2008.

Urbach, Nils and Smolnik, Stefan, "A Conceptual Model for Measuring the Effectiveness of Employee Portals," Proceedings of the Fifteenth Americas Conference on Information Systems, San Francisco, CA, Aug. 6-9, 2009.

\* cited by examiner

DEVICE REPUTATION MANAGEMENT

This application is a continuation of U.S. patent application Ser. No. 13/692,857, which was filed on Dec. 3, 2012, the entire disclosure of which is incorporated herein by reference. The benefit of such earlier filing date is claimed by applicant under 35 U.S.C. §120.

BACKGROUND OF THE INVENTION

1. Field of the Invention

The present invention relates generally to computer security and, more particularly, to methods of and systems for accurately identifying devices that have behaved maliciously and for proactively denying such devices access to services and data through computer networks.

2. Description of the Related Art

In this Information Revolution, it seems that nearly all information ever available in any form is being made available through the Internet. At the same time, access to the Internet and all the information it holds is growing, not just organically as individuals want access to the Internet but also in organized, motivated campaigns to "bridge the digital divide" and to bring Internet access to all who don't have it yet. Thus, the trend is toward everyone having access to all information in the world.

The infrastructure of the Internet is both widely adopted and highly convenient. Accordingly, some use the Internet to provide services that would otherwise be provided by legacy infrastructure, such as physical "brick and mortar" locations where activities such as shopping, banking, telephone conversations, and postal transactions have traditionally taken place. In addition, the Internet is increasingly used to share information between limited groups of geographically separated parties.

One of the greatest challenges in ubiquitous data access is security. Data is often personal and confidential and of high value. Accordingly, security is often of paramount importance for some of the information and services that are accessible through the Internet.

Security failures, in which a computer controlled by a person with malicious intent gains access to resources which the person is not authorized to obtain, are all too common. What is needed is a way to more effectively stop unauthorized intrusions into secure systems.

SUMMARY OF THE INVENTION

In accordance with the present invention, a device reputation server can recognize malicious devices used in prior attacks and prevent further attacks by the malicious devices, even attacks on systems that have not previously interacted with the malicious devices. Server computers require a digital fingerprint of any client devices prior to providing any service to such client devices. Logging of network activity by such servers includes digital fingerprints of all logged events associated with each client device to thereby identify a remotely located, physical computing device associated with each logged event.

Accordingly, logs of events of an attack include the digital fingerprint of the device perpetrating the attack. When an attack is detected or discovered, the attacked server reports the attack and the digital fingerprint of the perpetrating device to a device reputation server. The device reputation server uses the report to improve future assessments of the reputation of the device associated with the reported digital fingerprint.

The device reputation server stores data representing attacks reported by numerous servers, including digital fingerprints of perpetrating client devices. Using such data, the device reputation server assesses trustworthiness of a given device based on the number, recency, frequency, and severity, for example, of attacks that have been perpetrated by the given device.

The attacks reported to the device reputation server are from a large number of servers and the device reputation server serves requests for device reputations by any of a large number of servers. As a result, an attack on one server computer can affect the reputation of the device for, and therefore prevent future attacks on, a large number of other servers. Compared to other forms of device identification such as IP (Internet Protocol) and MAC (Media Access Control) addresses, digital fingerprints are complex, very tightly coupled to a particular computing device, and extremely difficult to discover or spoof. Accordingly, it is extremely difficult for a computing device to have access to the digital fingerprint of another computing device or to alter its own digital fingerprint.

Many believe that a very large majority of attacks on networked computers are perpetrated by a very small minority of users of networked computers. Most such users use a single computer that has been modified with expensive tools for hiding real IP and MAC addresses and otherwise obscuring any digital trails that might identify the user. Once the device reputation server has determined that the single computer has been used to perpetrate fraud, the single computer is no longer of any use for malicious activity among a very large number of servers.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Other use of the descriptions, pictures and accounts of this game without the express written consent of major league baseball is strictly prohibited. Component parts shown in the drawings are not necessarily to scale, and may be exaggerated to better illustrate the important features of the invention. In the drawings, like reference numerals may designate like parts throughout the different views, wherein:

DETAILED DESCRIPTION

Figure 1:
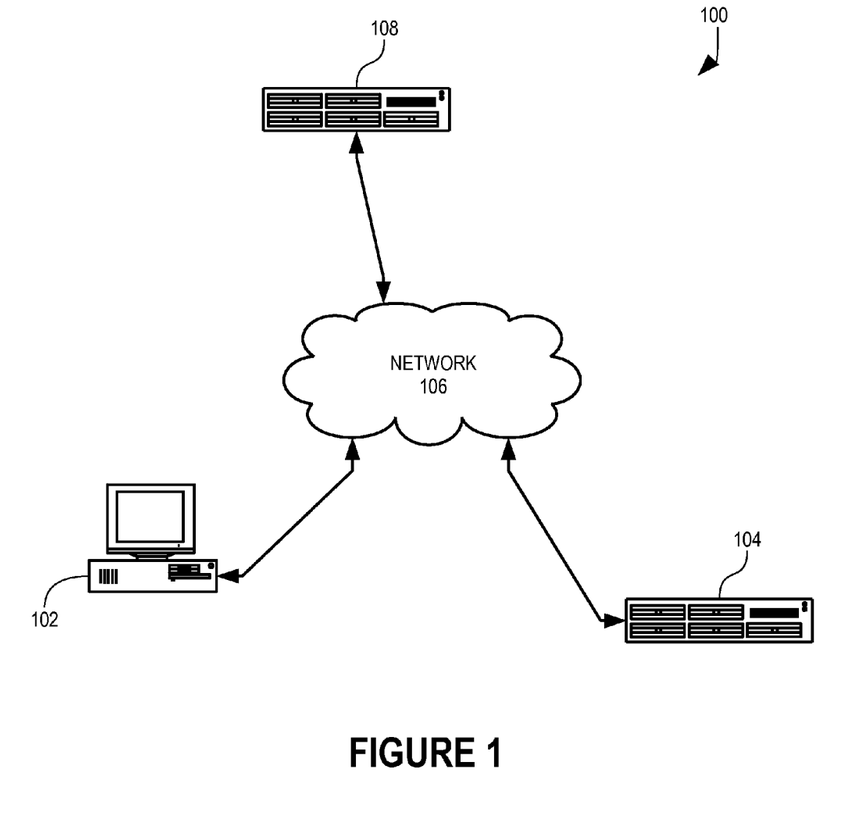
FIG. 1 is a diagram showing a server computer that interacts with a client computer in accordance with a reputation of the client computer received from a device reputation server in accordance with one embodiment of the present invention.

In accordance with the present invention, a device reputation server 108 can recognize malicious devices used in prior attacks and prevent further attacks by the malicious devices, even attacks on systems or other devices that have never interacted with any of the malicious devices before. Briefly, and in a manner described more completely below, a server computer 104 requires a digital fingerprint of any client devices, such as client computer 102, during authentication. Device reputation server 108 stores data representing attacks that have been detected and digital fingerprints associated with those attacks. By querying device reputation server 108, server computer 104 can determine whether client computer 102 is trustworthy for the particular services provided by server computer 104.

In providing a service, server computer 104 logs network events, including the digital fingerprint of devices involved in the network events. Accordingly, logs of events of an attack include the digital fingerprint of the device perpetrating the attack. Server computer 104 reports the attack and the digital fingerprint of the perpetrating device to device reputation server 108. Device reputation server 108 uses the report to improve future assessments of the reputation of the device associated with the reported digital fingerprint. It should be noted that device reputation server 108 provides a similar reputation assessment and reporting service to a large number of other server computers. As a result, an attack on one server computer can affect the reputation of the device for, and therefore prevent future attacks on, a large number of other servers.

Briefly, digital fingerprints are unique identifiers of individual devices based on hardware and system configuration data of each device. Compared to other forms of device identification such as IP (Internet Protocol) and MAC (Media Access Control) addresses, digital fingerprints are complex, very tightly coupled to a particular computing device, and extremely difficult to discover or spoof. In addition, and perhaps most significant, an advanced class of digital fingerprint is not predetermined by any single manufacturing entity or device supplier. Instead, the advanced digital fingerprint is derived or generated from multiple non-user configurable data strings that originate from various component manufacturers, and/or from user-configurable data entered or created by a user of the device being fingerprinted. In this sense, the advanced digital fingerprint is an "after-market" unique identifier that is derived or generated by a special fingerprinting application that is stored on the device, or that has access to data stored in memory locations on the target device. Accordingly, it is extremely difficult for a computing device to have access to the digital fingerprint of another computing device or to alter its own digital fingerprint. Digital fingerprints are known and are described, e.g., in U.S. Pat. No. 5,490,216 (sometimes referred to herein as the '216 Patent), and in U.S. Patent Application Publications 2007/0143073, 2007/0126550, 2011/0093920, and 2011/0093701 (collectively, "the related U.S. Patent Applications"), the descriptions of which are fully incorporated herein by reference.

Many believe that a very large majority of attacks on networked computers are perpetrated by a very small minority of users of networked computers. Most such users use a single computer that has been modified with expensive tools for hiding real IP and MAC addresses and otherwise obscuring any digital trails that might identify the user. Once device reputation server 108 has determined that the single computer has been used to perpetrate fraud, the fingerprint of the single computer is blacklisted and no longer of any use for malicious activity among a very large number of servers. The single computer will be immediately identifiable by its blacklisted fingerprint as a malicious device whenever it attempts to access a secure system.

Server computer 104 requires a digital fingerprint of a client device before server computer 104 will provide one or more services to the client device. In some embodiments, server computer 104 requires a digital fingerprint of a client device before server computer 104 will provide any services to the client device. Server computer 104 can be any type of server computing device that provides services to other computing devices, e.g., through a network such as wide area network 106. In this illustrative embodiment, wide area network 106 is the Internet.

Client computer 102 is a computing device that requests services of one or more servers, including server computer 104 through wide area network 106. Client computer 102 can be any type of networked computing device. In fact, designations of computers as servers and clients is largely arbitrary as many personal computing devices include server logic and many dedicated servers request services of other servers, thus acting as a client. As an example, server 104 requests a service of device reputation server 108 in a manner described below and is therefore a client of device reputation server 108.

Device reputation server 108 is a server that aggregates reports of network-based attacks of other computers and assesses and reports reputations of other devices based on those aggregated reports. It should be appreciated that the attack report aggregation and reputation assessment can be performed by server computer 104 for itself, and perhaps for other servers as well. However, the reputation management is described herein as being performed by device reputation server 108 for clarity of illustration and to describe the ability to manage reputations on a network-wide basis.

Figure 4:
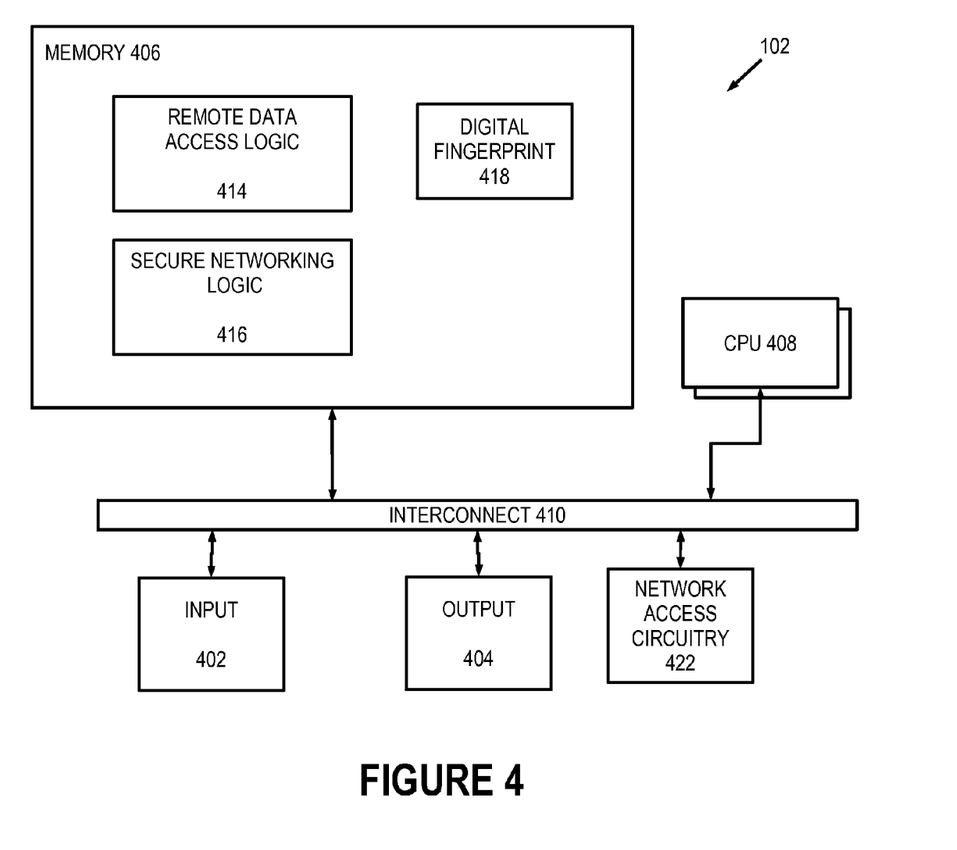
FIG. 4 is a block diagram showing the client computer of FIG. 1 in greater detail.

Transaction flow diagram 200 (FIG. 2) illustrates the manner in which server computer 104 controls access to its services to exclude known malicious computing devices. In step 202, client computer 102 requests a service provided by server computer 104. The request of step 202 includes a digital fingerprint of client device 102, i.e., digital fingerprint 418 (FIG. 4). An illustrative embodiment of step 202 is shown as transaction flow diagram 202 (FIG. 7) and is described more completely below.

In step 204 (FIG. 2), server computer 104 requests a reputation of client computer 102 from device reputation server 108 based on the received digital fingerprint.

Figure 2:
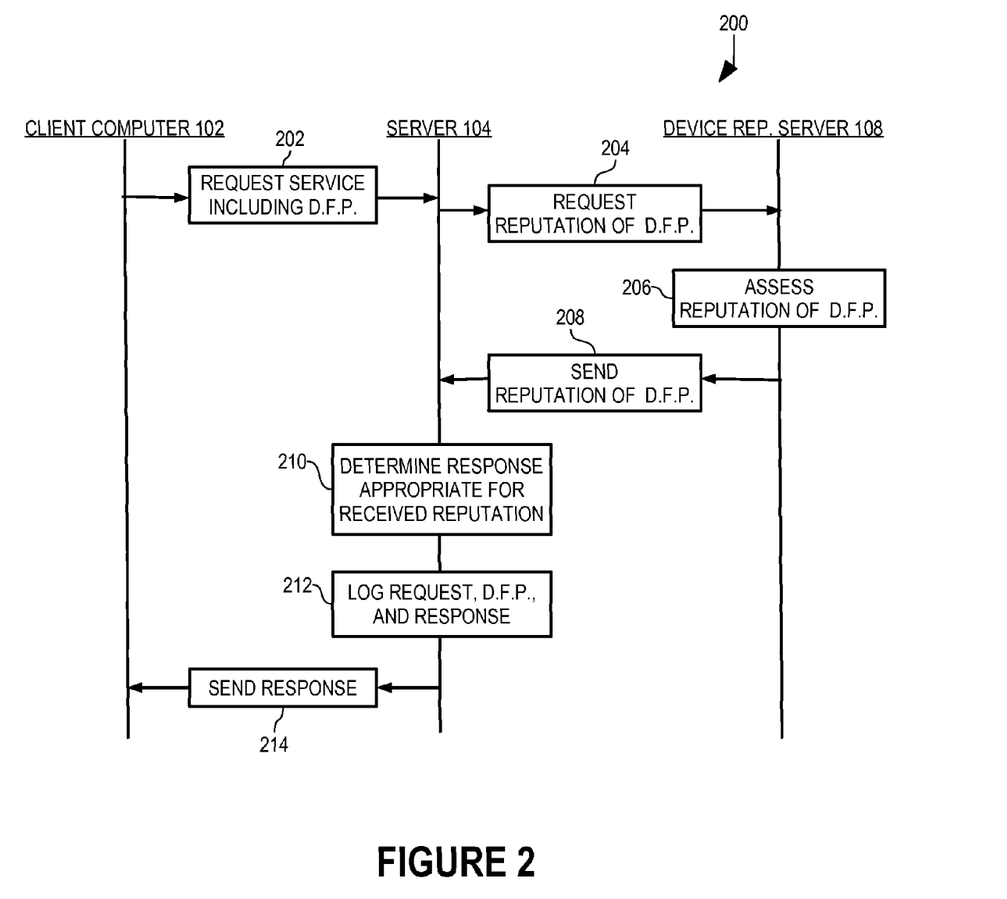
FIG. 2 is a transaction diagram illustrating one method of controlling access to resources of the server computer of FIG. 1 with respect to the client computer and the device reputation server of FIG. 1.

In step 206, device reputation server 108 assesses the reputation of client computer 102 using the received digital fingerprint of client computer 102. As described below, device reputation server 108 includes digital fingerprint reputation data 616 (FIG. 6) that represents a number of attacks and other malicious behavior reported to device reputation server 108 and associated digital fingerprints of the perpetrating devices. In addition, device reputation server 108 includes device reputation assessment logic 614.

There are a wide variety of ways to assess reputations based on data regarding attacks. In one embodiment, any device that has perpetrated even a single attack is labeled as malicious. In other embodiments, a device must have perpetrated a predetermined minimum number of attacks before the device is considered malicious. For example, if a computer is compromised and is used as a zombie to assist in perpetrating just a few attacks before the compromise is detected and repaired, e.g., by anti-virus software executing in the computer, the computer might not represent an ongoing security risk.

Figure 6:
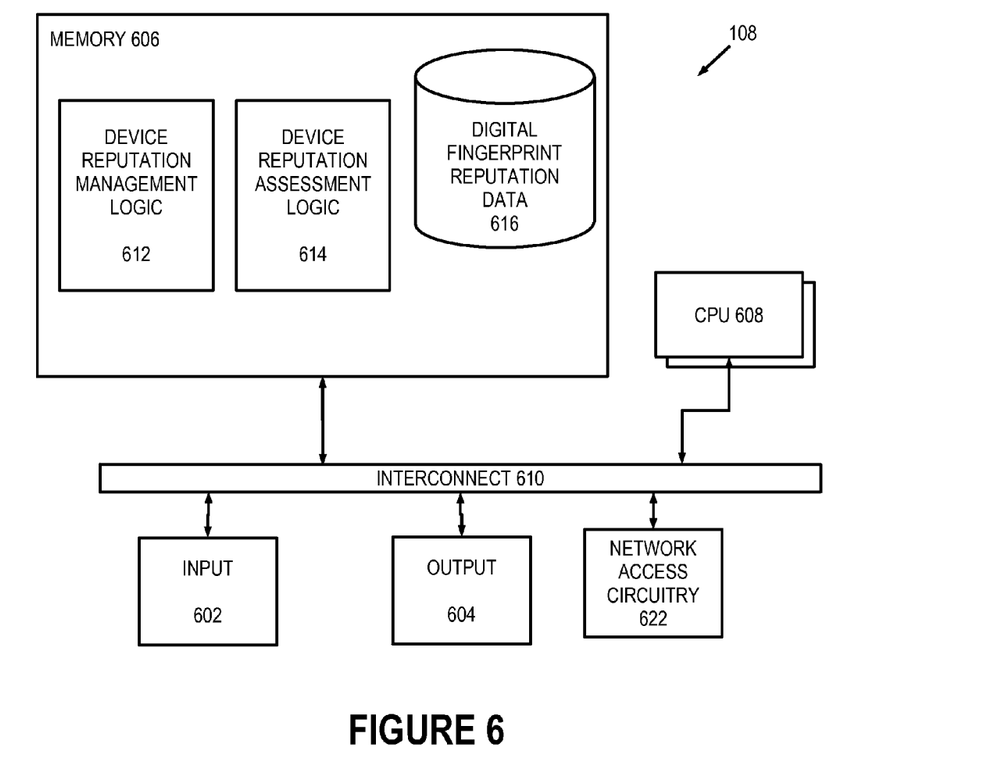
FIG. 6 is a block diagram showing the device reputation server computer of FIG. 1 in greater detail.

In yet other embodiments, the reputation is not a binary result of "malicious" or "trustworthy" but is instead a numerical reputation of trustworthiness along a scale from entirely malicious to entirely trustworthy—e.g., from 0.0 for malicious to 1.0 for trustworthy. Other factors used by device reputation assessment logic 614 beyond a number of attacks can include frequency of attacks, recency of attacks, severity of attacks, and correlation to attacks by other devices, for example. Correlation to attacks by other devices can be an important factor for large attacks by many zombie devices acting on behalf of a single entity because such attacks can be very damaging.

Once device reputation server 108 has assessed the reputation of client computer 102 in step 206 (FIG. 2), device reputation server 108 sends the assessed reputation to server computer 104 in step 208.

In step 210, server computer 104 determines an appropriate response given the reputation of client computer 102 received from device reputation server 108. One possible response is denial of service to client computer 102 if the reputation of client computer 102 is insufficiently trustworthy. Another possible response is to provide the requested service to client computer 102 if the reputation of client computer 102 is sufficiently trustworthy.

For some types of network-based services, a more complex response may be appropriate. For example, one possible response for a device known to be used repeatedly for identity theft and theft of credit card data is to provide the requested service but with data that can later be used to identify the person using the device for malicious purposes. For example, such a device can be permitted to retrieve credit card data but the credit card data can be used to detect improper purchases and to note the delivery address. The purchase and the delivery address can be provided to law enforcement personnel to effect an arrest of the person.

The response determined by server computer 104 in step 210 can also be influenced by other activity. For example, during extremely heavy request traffic for server computer 104, server computer 104 can deny service to devices with even slightly untrustworthy reputations as they can be zombies engaged in a denial of service attack. Accordingly, service would not be interrupted for trustworthy client devices.

In step 212 (FIG. 2), server computer 104 logs the request, the digital fingerprint of client computer 102, and the response determined in step 210. Generally, most, if not all, network activity is logged in most computer systems, particularly in computer systems intended to act as a server computer. However, in step 212, server computer 104 includes the digital fingerprint of client computer 102 in the events recorded in the logs.

Server computer 104 logs the digital fingerprints of all client devices regardless of reputation in step 212. Accordingly, if an attack on server computer 104 is later discovered, the logs can indicate that a previously trustworthy device perpetrated the attack and device reputation server 108 can be made aware of the attack in a manner described more completely below.

In step 214, server computer 104 effects the response determined to be appropriate in step 210. After step 214, processing according to transaction flow diagram 200 completes.

Transaction flow diagram 300 (FIG. 3) illustrates the reporting to device reputation server 108 of an attack detected by server computer 104. In step 302, server computer 104 detects an attack. There are a number of ways in which attacks are detected. For example, service logs 516 (FIG. 5) of file transports through wide area network 106 (FIG. 1) can show that highly sensitive files were sent to an IP address to which the files should not have been sent. Service logs 516 can also show that a purchase was made using a credit card that had been reported to have been used fraudulently as another example. Numerous other ways of detecting an attack are known and are not described further herein.

In step 304 (FIG. 3), server computer 104 analyzes service logs 516 to identify the digital fingerprint of the device that perpetrated the attack that was detected in step 302. In particular, server computer 104 identifies one or more events represented in service logs 516 that represent the constituent events of the subject attack and identifies one or more digital fingerprints associated with those events.

Figure 8:
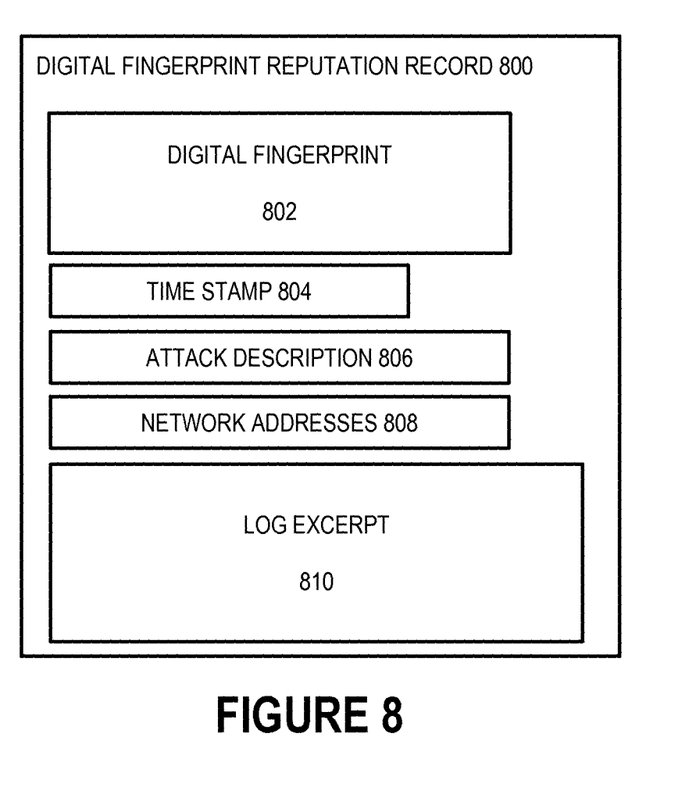
FIG. 8 is a block diagram illustrating one example of a digital fingerprint reputation record of digital fingerprint reputation data of the device reputation server of FIG. 6.

In step 306 (FIG. 3), server computer 104 sends data representing the attack to device reputation server 108. The data representing the attack includes data such as that shown in digital fingerprint reputation record 800 (FIG. 8).

Figure 3:
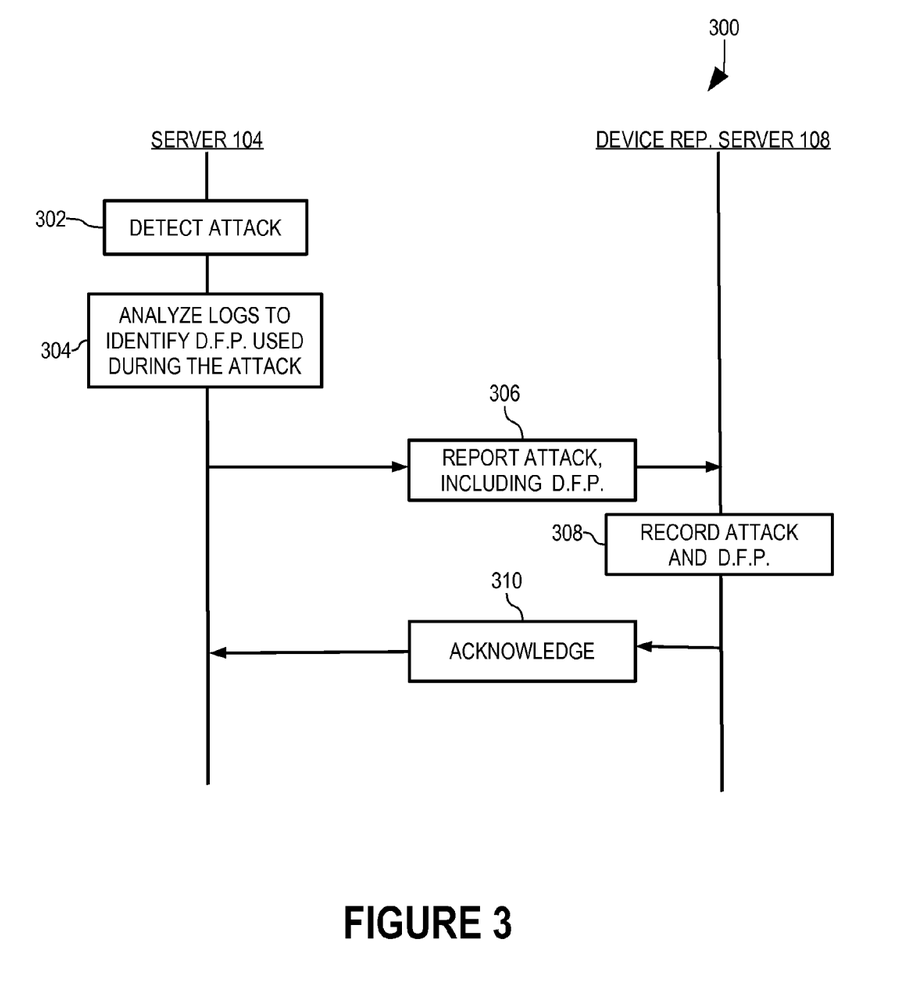
FIG. 3 is a transaction diagram illustrating one method of reporting an attack by the client computer of FIG. 1 to the device reputation server of FIG. 1.

Digital fingerprint 802 is the digital fingerprint associated with the attack detected in step 302 and identified in step 304, which is sometimes referred to as "the subject attack" in the context of digital fingerprint 800 and transaction flow diagram 300 (FIG. 3). In some embodiments, digital fingerprint 802 (FIG. 8) can include more than one digital fingerprint in cases in which an attack is associated with multiple digital fingerprints. In other embodiments, a separate digital fingerprint reputation record 800 is created for each digital fingerprint associated with a given attack.

Time stamp 804 represents the date and time of the subject attack. Device reputation assessment logic 614 (FIG. 6) uses time stamp 804 to determine recency and frequency of attacks by a given device.

Attack description 806 (FIG. 8) describes the subject attack. The subject attack can be described by a type of attack for example. Types of attacks can include such types as denial of service, man in the middle, compromised key, sniffer, eavesdropping, and data modification, for example.

Network addresses 808 identifies any network addresses used in the subject attack, including IP and MAC addresses, for example.

Log excerpt 810 includes portions of service logs 516 (FIG. 5) that represent constituent events of the subject attack. In one embodiment, the events represented in service logs 516 included in log excerpt 810 are complete. In an alternative embodiment, the events are modified so as to obscure information about the configuration of server computer 104, preserving only the information of the events that describe the particular activity of the perpetrating client device. Log excerpt 810 can also include events of other client devices in close temporal proximity to events of the perpetrating client device to provide contextual information of the subject attack.

In step 308 (FIG. 3), device reputation server 108 records the reported attack and the associated digital fingerprint received in step 308 into digital fingerprint reputation data 616 (FIG. 6). In this illustrative embodiment, digital fingerprint reputation data 616 is a database and includes records of the format of digital fingerprint reputation record 800 (FIG. 8).

In step 310 (FIG. 3), device reputation server 108 acknowledges receipt of the report of the subject attack. After step 310, processing according to transaction flow diagram 300 completes. Thereafter, the subject attack is represented in digital fingerprint reputation data 616 (FIG. 6) and is available to evaluate the reputation of the perpetrating client device subsequently.

Client computer 102 is shown in greater detail in FIG. 4 and includes one or more microprocessors 408 (collectively referred to as CPU 408) that retrieve data and/or instructions from memory 406 and execute retrieved instructions in a conventional manner. Memory 406 can include generally any computer-readable medium including, for example, persistent memory such as magnetic and/or optical disks, ROM, and PROM and volatile memory such as RAM.

CPU 408 and memory 406 are connected to one another through a conventional interconnect 410, which is a bus in this illustrative embodiment and which connects CPU 408 and memory 406 to one or more input devices 402, output devices 404, and network access circuitry 422. Input devices 402 can include, for example, a keyboard, a keypad, a touch-sensitive screen, a mouse, and a microphone. Output devices 404 can include, for example, a display—such as a liquid crystal display (LCD)—and one or more loudspeakers. Network access circuitry 422 sends and receives data through a wide area network 106 (FIG. 1) such as the Internet and/or mobile device data networks.

A number of components of client computer 102 are stored in memory 406. In particular, remote data access logic 414 and secure networking logic 416 are each all or part of one or more computer processes executing within CPU 408 from memory 406 in this illustrative embodiment but can also be implemented using digital logic circuitry. As used herein, "logic" refers to (i) logic implemented as computer instructions and/or data within one or more computer processes and/or (ii) logic implemented in electronic circuitry. Digital fingerprint 418 is data stored persistently in memory 406.

Remote data access logic 414 can implement any of a number of remote data access protocols, such as HTTP (Hypertext Transport protocol), FTP (File Transport Protocol), NFS (Network File System) and CIFS (Common Internet File System) protocols for example, all of which are known and not described herein in further detail. In addition, secure networking logic 416 can implement any of a number of known Virtual Private Network (VPN) protocols.

Figure 5:
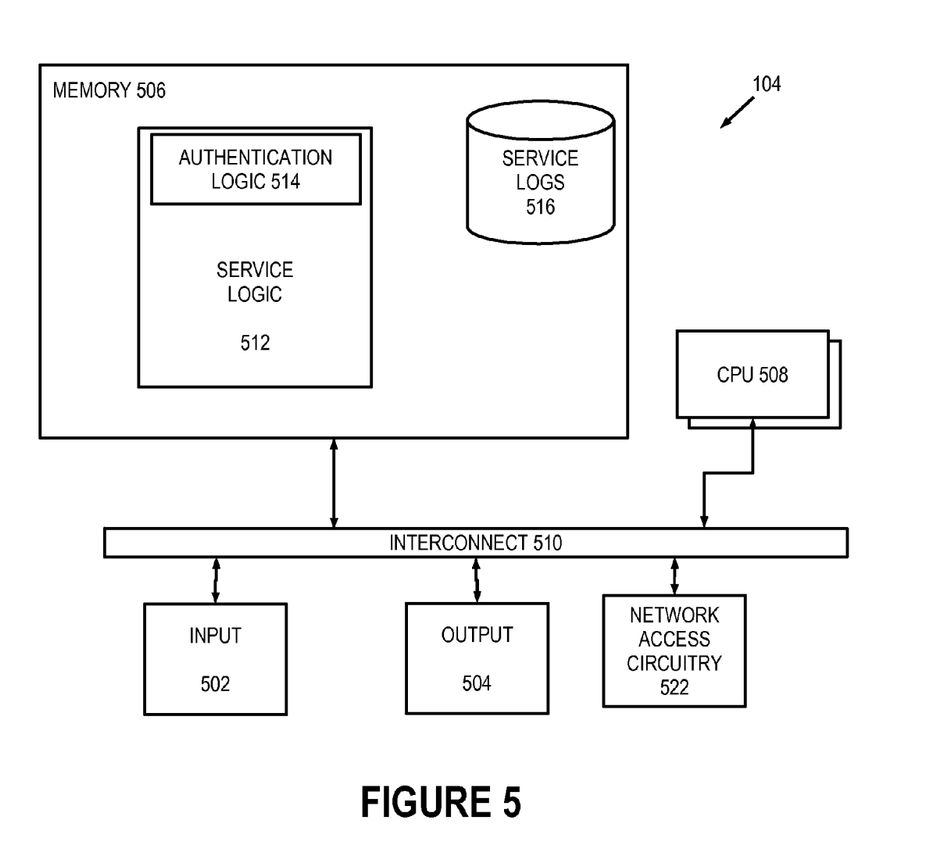
FIG. 5 is a block diagram showing the server computer of FIG. 1 in greater detail.

Server computer 104 (FIG. 1) is shown in greater detail in FIG. 5 and includes a CPU 408, memory 406, interconnect 410, input devices 502, output devices 504, and network access circuitry 52 that are directly analogous to CPU 408 (FIG. 4), memory 406, interconnect 410, input devices 402, output devices 404, and network access circuitry 422, respectively, of client computer 102. Since server computer 104 (FIG. 5) is a server computer, input devices 502 and output devices 504 can be omitted and server computer 104 can interact with one or more human users exclusively through network access circuitry 522, e.g., through a remote command shell protocol such as the known 'ssh' remote command shell protocol.

A number of components of server computer 104 are stored in memory 506. In particular, service logic 512, including authentication logic 514, is all or part of one or more computer processes executing within CPU 508 from memory 506 in this illustrative embodiment but can also be implemented using digital logic circuitry. Service logs 516 are data stored persistently in memory 506. Except as otherwise described herein, service logs 516 are conventional. For example, Linux-based servers log events, network and system events among others, in various logs stored in a '/var/log' directory.

Service logic 512 specifies the one or more services provided by server computer 104 and can include a web server, an FTP server, remote data access protocols such as SMB and CIFS, and VPN protocols. To ensure all client devices are properly identified by their respective digital fingerprints, service logic 512 includes authentication logic 514 that causes server computer 104 to behave in the manner described herein.

Device reputation server 108 (FIG. 1) is shown in greater detail in FIG. 6 and includes a CPU 608, memory 606, interconnect 610, input devices 602, output devices 604, and network access circuitry 622 that are directly analogous to CPU 408 (FIG. 4), memory 406, interconnect 410, input devices 402, output devices 404, and network access circuitry 422, respectively, of client computer 102. Since device reputation server 108 (FIG. 5) is a server computer, input devices 602 and output devices 604 can be omitted and device reputation server 108 can interact with one or more human users exclusively through network access circuitry 622, e.g., through a remote command shell protocol such as the known 'ssh' remote command shell protocol.

A number of components of device reputation server 108 are stored in memory 606. In particular, device reputation management logic 612 and device reputation assessment logic 614 are each all or part of one or more computer processes executing within CPU 608 from memory 606 in this illustrative embodiment but can also be implemented using digital logic circuitry. Digital fingerprint reputation data 616 is data stored persistently in memory 606. In this illustrative embodiment, digital fingerprint reputation data 616 is organized as a database.

Device reputation management logic 612 serves requests for device reputations and accepts and records reports of attacks in the manner described herein. Device reputation assessment logic 614 assesses reputations of devices using data stored in digital fingerprint reputation data 616 in the manner described herein.

Transaction flow diagram 202 (FIG. 7) shows step 202 (FIG. 2) in greater detail.

In step 702 (FIG. 7), client computer 102 sends a request for a service provided by server computer 104.

Figure 7:
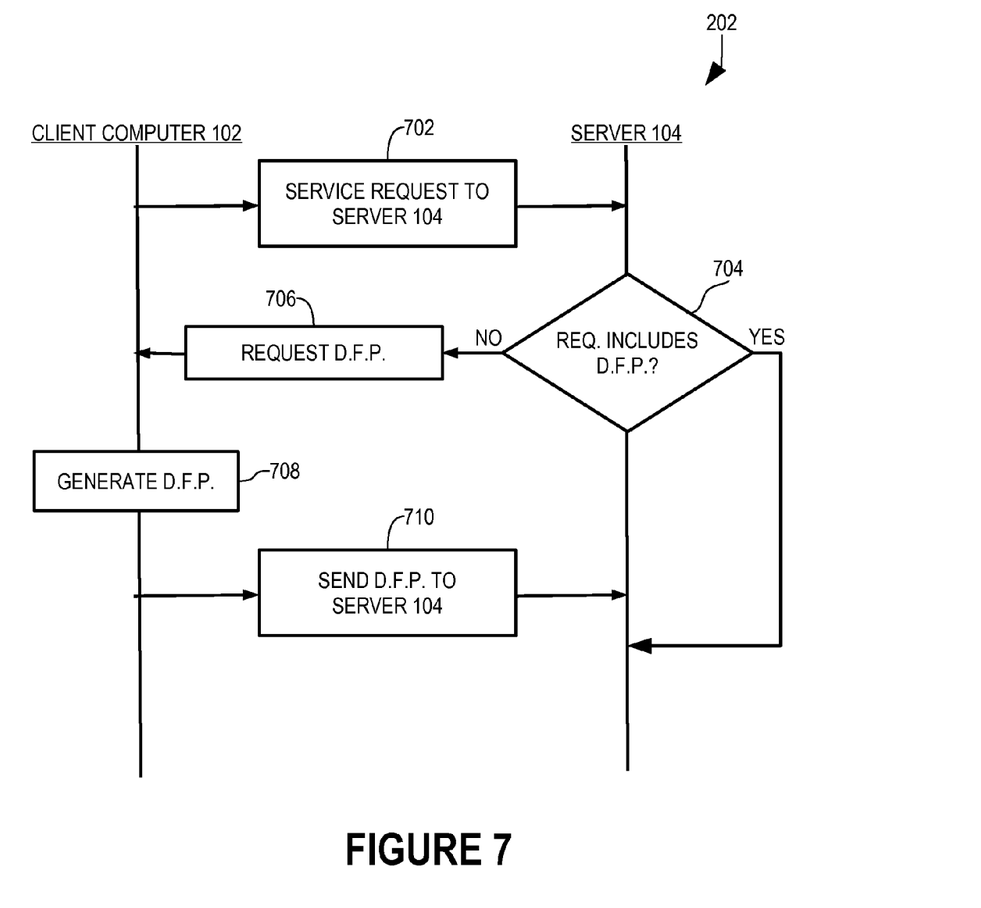
FIG. 7 is a transaction diagram illustrating one embodiment according to the invention of a method of a service request by the client computer of FIG. 1 for proper authentication with the server computer of FIG. 1.

In test step 704 (FIG. 7), authentication logic 514 (FIG. 5) determines whether the request of 702 includes a digital fingerprint. If so, processing according to transaction flow diagram 202, and therefore step 202 (FIG. 2), completes, skipping steps 706-710 (FIG. 7).

Conversely, if the request of step 702 does not include a digital fingerprint, processing by authentication logic 514 transfers to step 706, in which authentication logic 514 requests a digital fingerprint from client computer 102.

In response to such a request and in step 708, client computer 102 generates a digital fingerprint of itself. In some embodiments, client computer 102 creates the digital fingerprint of itself using logic independently and previously installed in client computer 102. In other embodiments, data repository 104 directs client computer 102 to obtain digital fingerprint generation logic, e.g., from server 108 by executing a fingerprinting algorithm, e.g., in the form of an applet, and to then execute the logic to thereby generate a digital fingerprint of client computer 102. The applet may encode a generated digital fingerprint with an authenticating certificate or other binary code that authenticates the digital fingerprint as a fingerprint that was generated by an authorized algorithm. The particular manner in which data repository 104 specifies the logic to be obtained by client computer 102 and the particular manner in which client computer 102 executes the logic are unimportant and there are many known ways for accomplishing each. The generation of a digital fingerprint is described in the '216 Patent and the related U.S. Patent Applications and those descriptions are incorporated herein by reference.

Thus, according to transaction flow diagram 202, server computer 104 ensures that client computer 102 has provided its digital fingerprint as a precondition for providing services requested by client computer 102.

The above description is illustrative only and is not limiting. The present invention is defined solely by the claims which follow and their full range of equivalents. It is intended that the following appended claims be interpreted as including all such alterations, modifications, permutations, and substitute equivalents as fall within the true spirit and scope of the present invention.

What is claimed is:

1. A method for determining the trustworthiness of a remotely located, subject device, the method comprising:
   receiving data representing one or more attacks by one or more perpetrating devices;
   receiving a request for a reputation of the subject device through a computer network;
   determining whether the subject device is one of the perpetrating devices;
      retrieving data representing one or more of the attacks that are associated with the subject device;
      quantifying a measure of trustworthiness of the subject device from the data representing one or more of the attacks that are associated with the subject device; and
      sending data representing the measure of trustworthiness of the subject device in response to the request.

2. The method of claim 1 wherein the subject device and the perpetrating devices are each identified by respective digital fingerprints.

3. The method of claim 1 wherein the data representing one or more attacks by one or more perpetrating devices includes digital fingerprints of the perpetrating devices.

4. The method of claim 1 wherein the data representing one or more attacks by one or more perpetrating devices includes excerpts of logs of network activity.

5. The method of claim 1 wherein the data representing one or more attacks by one or more perpetrating devices includes time stamps indicating the time of each of the attacks.

6. A non-transitory computer readable medium useful in association with a computer which includes one or more processors and a memory, the non-transitory computer readable medium including computer instructions which are configured to cause the computer, by execution of the computer instructions in the one or more processors from the memory, to determine the trustworthiness of a remotely located, subject device by at least:
   receiving data representing one or more attacks by one or more perpetrating devices;
   receiving a request for a reputation of the subject device through a computer network;
   determining whether the subject device is one of the perpetrating devices;
   retrieving data representing one or more of the attacks that are associated with the subject device;
   quantifying a measure of trustworthiness of the subject device from the data representing one or more of the attacks that are associated with the subject device; and
   sending data representing the measure of trustworthiness of the subject device in response to the request.

7. The non-transitory computer readable medium of claim 6 wherein the subject device and the perpetrating devices are each identified by respective digital fingerprints.

8. The non-transitory computer readable medium of claim 6 wherein the data representing one or more attacks by one or more perpetrating devices includes digital fingerprints of the perpetrating devices.

9. The non-transitory computer readable medium of claim 6 wherein the data representing one or more attacks by one or more perpetrating devices includes excerpts of logs of network activity.

10. The non-transitory computer readable medium of claim 6 wherein the data representing one or more attacks by one or more perpetrating devices includes time stamps indicating the time of each of the attacks.

11. A computer system comprising:
   at least one processor;
   a computer readable medium that is operatively coupled to the processor; and
   device reputation management logic (i) that executes in the processor from the computer readable medium and (ii) that, when executed by the processor, causes the computer to determine the trustworthiness of a remotely located, subject device by at least:
      receiving data representing one or more attacks by one or more perpetrating devices;
      receiving a request for a reputation of the subject device through a computer network;
      determining whether the subject device is one of the perpetrating devices;
      retrieving data representing one or more of the attacks that are associated with the subject device;
      quantifying a measure of trustworthiness of the subject device from the data representing one or more of the attacks that are associated with the subject device; and
      sending data representing the measure of trustworthiness of the subject device in response to the request.

12. The computer system of claim 11 wherein the subject device and the perpetrating devices are each identified by respective digital fingerprints.

13. The computer system of claim 11 wherein the data representing one or more attacks by one or more perpetrating devices includes digital fingerprints of the perpetrating devices.

14. The computer system of claim 11 wherein the data representing one or more attacks by one or more perpetrating devices includes excerpts of logs of network activity.

15. The computer system of claim 11 wherein the data representing one or more attacks by one or more perpetrating devices includes time stamps indicating the time of each of the attacks.

* * * * *